(12) United States Patent
Goldstein et al.

(10) Patent No.: US 10,773,879 B2
(45) Date of Patent: *Sep. 15, 2020

(54) THERMAL SHIELD FOR MAINTAINING A GENERALLY CONSTANT TEMPERATURE

(71) Applicant: SUNWELL ENGINEERING COMPANY LIMITED, Woodbridge (CA)

(72) Inventors: Vladimir Goldstein, Woodbridge (CA); Cory Rosa, Belleville (CA); Cong-Binh Do, Etobicoke (CA)

(73) Assignee: SUNWELL ENGINEERING COMPANY LIMITED, Woodbridge, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/146,633

(22) Filed: Sep. 28, 2018

(65) Prior Publication Data

US 2019/0031431 A1 Jan. 31, 2019

Related U.S. Application Data

(63) Continuation-in-part of application No. 15/516,314, filed as application No. PCT/CA2015/050993 on Oct. 2, 2015, now Pat. No. 10,093,078.

(60) Provisional application No. 62/059,549, filed on Oct. 3, 2014.

(51) Int. Cl.
| | |
|---|---|
| *B32B 3/00* | (2006.01) |
| *B65D 88/74* | (2006.01) |
| *B65D 90/04* | (2006.01) |
| *B62D 33/04* | (2006.01) |
| *B60P 3/20* | (2006.01) |
| *B60H 1/00* | (2006.01) |

(52) U.S. Cl.
CPC ......... *B65D 88/74* (2013.01); *B60H 1/00014* (2013.01); *B60H 1/00295* (2019.05); *B60P 3/20* (2013.01); *B62D 33/048* (2013.01); *B65D 90/046* (2013.01); *B60H 2001/00307* (2013.01)

(58) Field of Classification Search
CPC .. B65D 88/74; B65D 90/046; B60H 1/00014; B60H 1/00295; B60H 2001/00307; B60P 3/20; B62D 33/048
See application file for complete search history.

(56) References Cited

U.S. PATENT DOCUMENTS

| | | | |
|---|---|---|---|
| 4,178,565 | A | 12/1979 | Morton |
| 5,023,043 | A | 6/1991 | Kotzlowski |
| 5,100,016 | A | 3/1992 | Wischusen, III |

(Continued)

FOREIGN PATENT DOCUMENTS

| | | |
|---|---|---|
| CN | 2017-24467 | 1/2011 |
| EP | 1 616 543 | 1/2006 |
| JP | 09-013642 | 1/1997 |

OTHER PUBLICATIONS

International Search Report dated Dec. 16, 2015 in International Application No. PCT/CA2015/050993.
European Search Re[prt dated Aug. 3, 2018 in EP 15845789.5.

*Primary Examiner* — Elizabeth E Mulvaney
(74) *Attorney, Agent, or Firm* — Faegre Drinker Biddle & Reath LLP

(57) ABSTRACT

A thermal shield comprises an insulation layer having a space defined therein, wherein a low-conductivity material fills the space, and a valve configured to connect to a vacuum to remove air from the space, thereby increasing insulating properties of the insulation layer.

17 Claims, 10 Drawing Sheets

(56) References Cited

U.S. PATENT DOCUMENTS

2009/0250189 A1   10/2009  Soukhojak
2014/0193761 A1    7/2014  Donnelly
2016/0109187 A1    4/2016  Houdek

THERMAL SHIELD FOR MAINTAINING A GENERALLY CONSTANT TEMPERATURE

CROSS-REFERENCE TO RELATED APPLICATIONS

This application is a continuation-in-part based off of U.S. patent application Ser. No. 15/516,314 filed on Oct. 2, 2015 and claiming priority to U.S. Provisional Application No. 62/059,549 filed on Oct. 3, 2014.

FIELD OF THE INVENTION

The subject application relates to a thermal shield for maintaining a generally constant temperature.

BACKGROUND OF THE INVENTION

It is common to ship products over vast distances by ground, sea and/or air transportation. In many instances, the products being shipped are placed in containers. When the products are not temperature-sensitive, there is typically no need to provide the containers with temperature control systems. When the products are temperature-sensitive, it is necessary to maintain a substantially uniform and constant temperature to avoid spoilage. As a result, thermal shields are often placed on top of the products. Many designs for thermal shields have been considered.

For example, U.S. Pat. No. 5,100,016 to Wischusen discloses insulation material configured to provide improved insulating properties in a shipping container. An insulated bottom section is placed along the bottom of a container under the contents of the container. An insulating blanket constructed of plastic sheets sealed to form pouches for containing paperboard and mineral wool is configured to have an inverted U-shape and is placed over a bottom half of the container. A top half of the container is then placed over the bottom half such that the legs of the inverted U-shaped material are between the overlapping sides of top and bottom of the container and the middle portion of the U-shaped material is between the top of the container and the contents within the container.

Although thermal shields have been considered, improvements are desired. It is therefore an object to provide a novel thermal shield for maintaining a generally constant temperature.

SUMMARY

Accordingly, in one aspect there is provided a thermal shield comprising a thermally conductive layer, and at least one heat exchange fluid circuit coupled to a first surface of the thermally conductive layer, the at least one heat exchange fluid circuit comprising at least one inlet configured to permit the ingress of heat exchange fluid.

In an embodiment, the at least one heat exchange fluid circuit extends about the first surface of the thermally conductive layer. In an embodiment, the at least one heat exchange fluid circuit extends about the first surface of the thermally conductive layer in a serpentine path. In another embodiment, a first insulation layer having a first surface is connected to the first surface of the thermally conductive layer.

In an embodiment, the first insulation layer comprises at least one groove defined in the first surface, the at least one heat exchange fluid circuit being defined by the at least one groove. The at least one heat exchange fluid circuit comprises at least one tubular member. An inlet header is coupled to the at least one inlet of the heat exchange fluid circuit and is configured to direct heat exchange fluid received from a storage unit to the at least one inlet. The heat exchange fluid circuit comprises at least one outlet configured to direct the egress of heat exchange fluid. An outlet header is coupled to the at least one outlet of the heat exchange fluid circuit and is configured to direct heat exchange fluid received from the at least one outlet to the storage unit.

According to another aspect there is provided a system for maintaining a generally constant temperature, the system comprising a thermal shield comprising a thermally conductive layer, and at least one heat exchange fluid circuit coupled to a first surface of the thermally conductive layer, the at least one heat exchange fluid circuit comprising at least one inlet configured to permit the ingress of heat exchange fluid, and a pumping unit configured to pump heat exchange fluid into the at least one heat exchange fluid circuit.

In an embodiment, the system comprises a storage unit for storing heat exchange fluid, the pumping unit configured to pump heat exchange fluid from the storage unit into the at least one heat exchange fluid circuit.

According to another aspect there is provided a method for maintaining a generally constant temperature in a container comprising one or more temperature sensitive products, the method comprising providing a thermal shield comprising a thermally conductive layer and at least one heat exchange fluid circuit coupled to a first surface of the thermally conductive layer, the thermal shield being placed over the one or more temperature sensitive products, and selectively pumping a heat exchange fluid from a storage unit through the at least one heat exchange fluid circuit via a pumping unit.

In an embodiment, the selective pumping is based on one or more criteria. The one or more criteria comprises in the event that the temperature is above or below a threshold value, pumping the heat exchange fluid. The one or more criteria comprises in the event that a blockage condition is detected in the at least one heat exchange fluid circuit, shutting down the pumping unit. The one or more criteria comprises in the event that a blockage condition is detected in the at least one heat exchange fluid circuit, closing a valve associated with the at least one heat exchange fluid circuit.

In an embodiment, the method comprises monitoring a temperature of heat exchange fluid leaving the storage unit, monitoring a temperature of heat exchange fluid coming into the storage unit, and if the monitored temperatures are not equal, continuously pumping heat exchange fluid through the at least one heat exchange fluid until the monitored temperatures are approximately equal.

BRIEF DESCRIPTION OF THE DRAWINGS

Embodiments will now be described more fully with reference to the accompanying drawings in which.

DETAILED DESCRIPTION OF THE EMBODIMENTS

Figure 1:
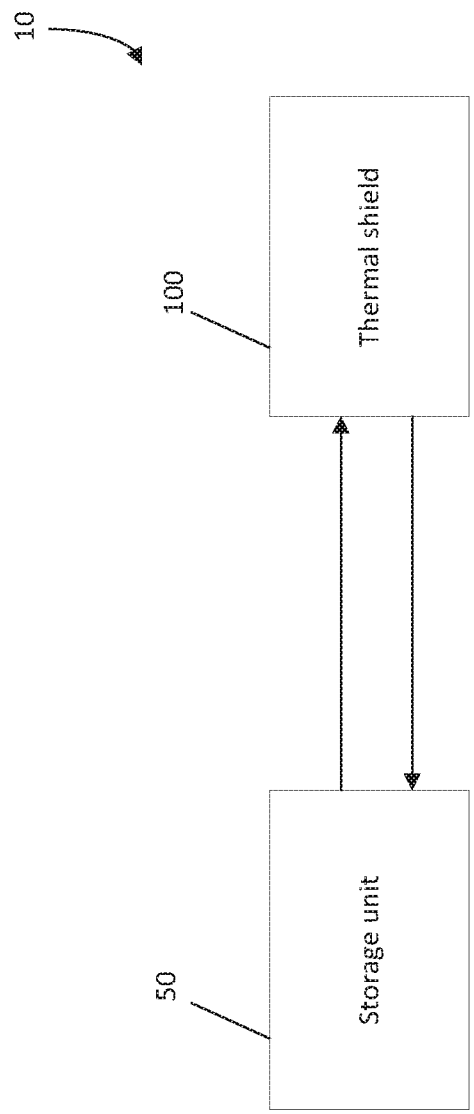
FIG. 1 is a block diagram of a system for maintaining a generally constant temperature in a container.

Turning to FIG. 1, a system for maintaining a generally constant temperature in a container is shown and is generally identified by reference numeral 10. The system 10 comprises a storage unit 50 fluidly coupled to a thermal shield 100. The system 10 is configured to be placed in a container such that the thermal shield 100 overlaps one or more temperature sensitive products.

The storage unit 50 comprises a storage tank and a pumping unit. In this embodiment, the storage tank stores heat exchange fluid. The pumping unit is configured to pump heat exchange fluid from the storage tank to the thermal shield 100, as will be described in more detail below.

Figure 2:
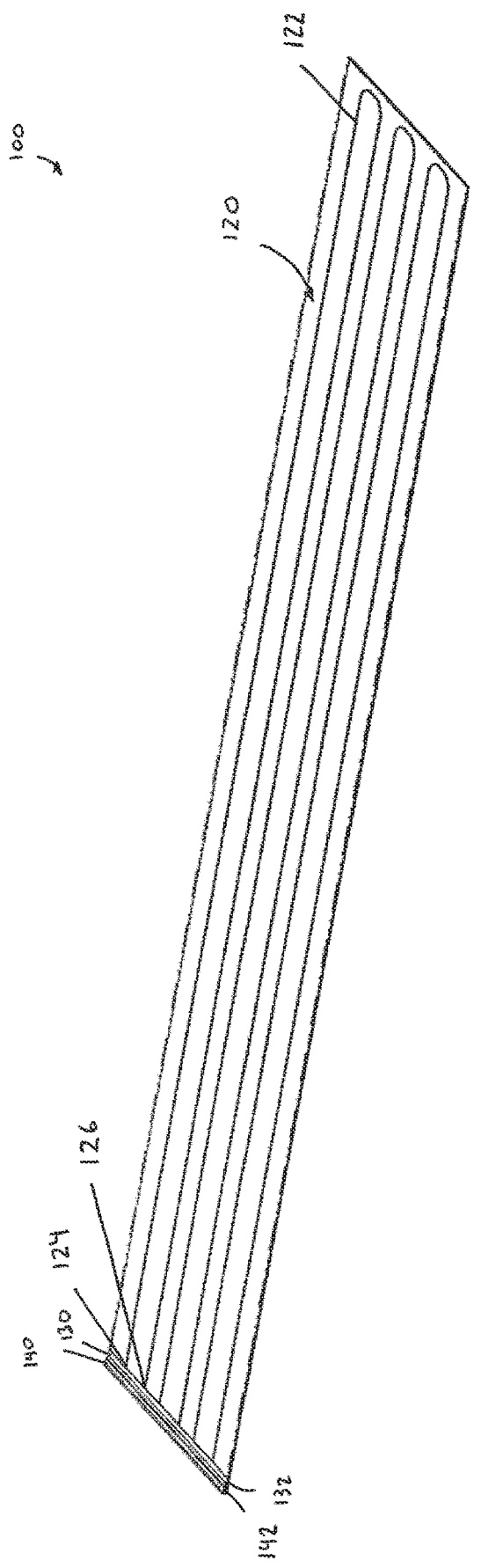
FIG. 2 is an isometric view of a thermal shield forming part of the system of FIG. 1.
Figure 3:
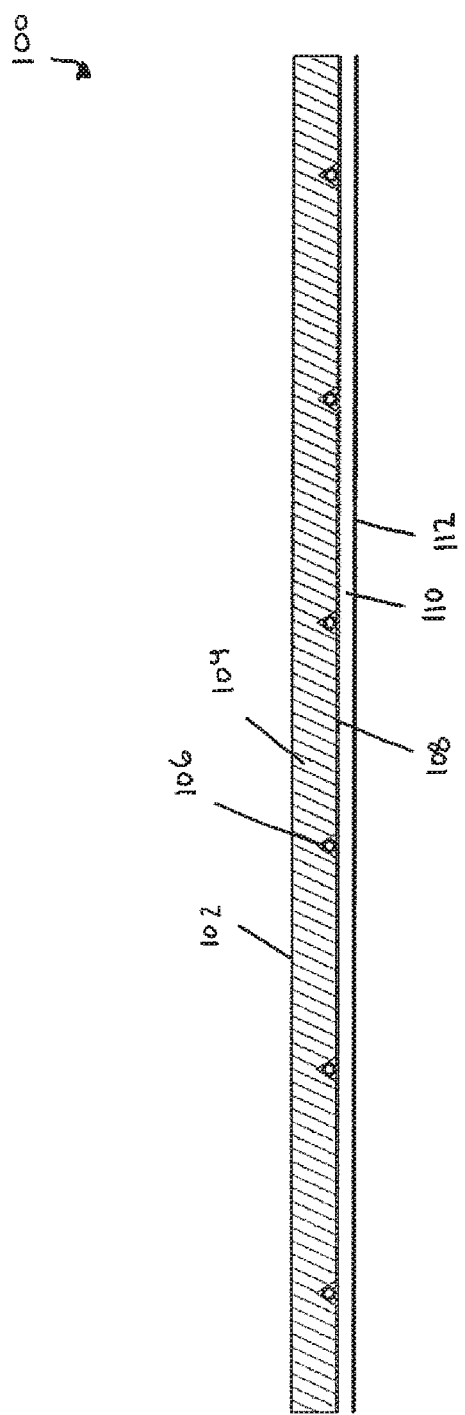
FIG. 3 is a cross-sectional view of the thermal shield of FIG. 2.
Figure 4:
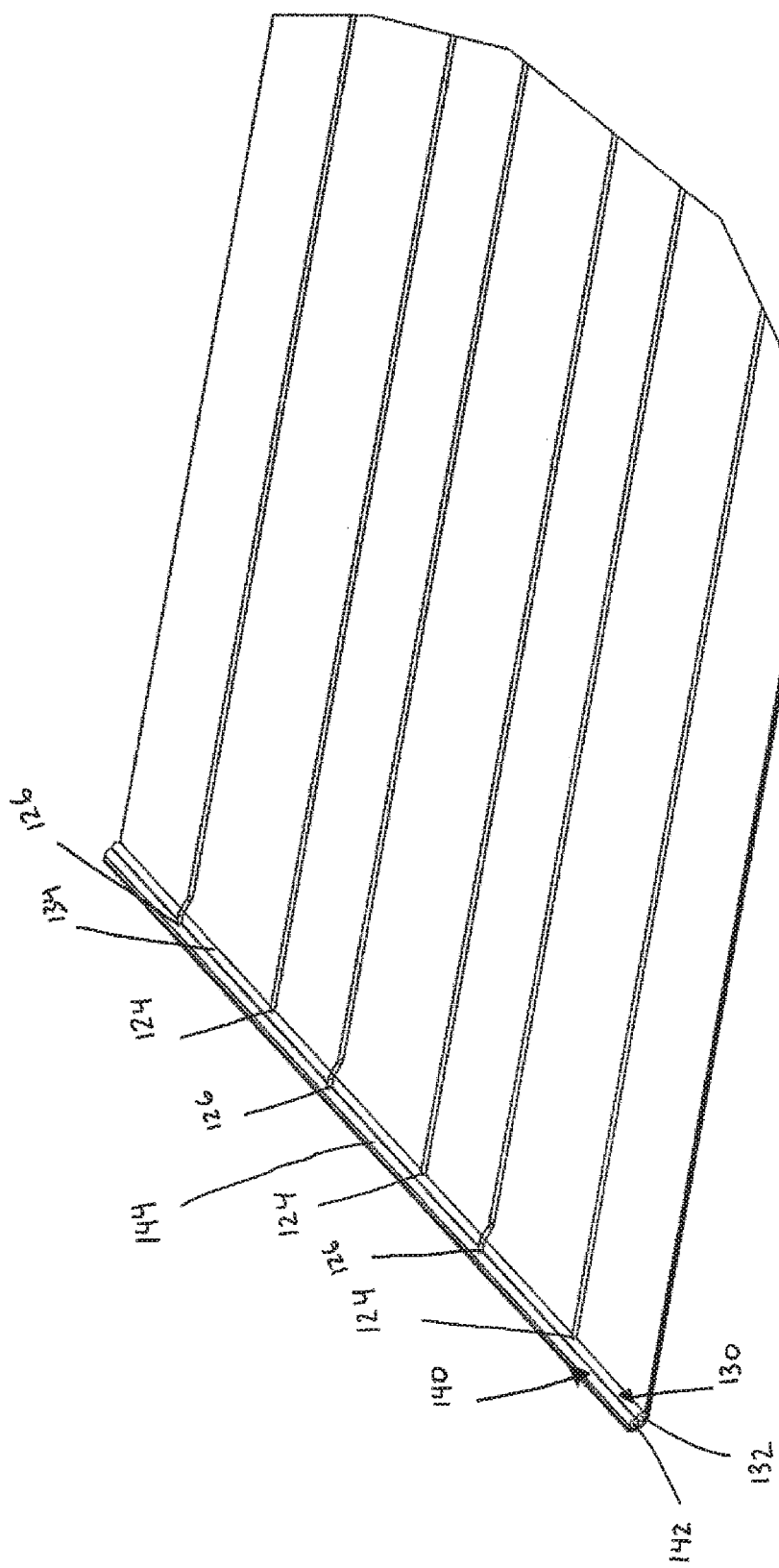
FIG. 4 is an enlarged partial view showing an inlet and outlet header of the thermal shield of FIG. 2.

The thermal shield 100 is best shown in FIGS. 2 to 4. The thermal shield 100 is made of a layered construction. The thermal shield 100 comprises an outer protective layer 102 which in this embodiment is made of protective material such as for example canvas.

The thermal shield 100 also comprises an outer insulation layer 104 coupled to an interior surface of the outer protective layer 102. The outer insulation layer 104 is made of a thermally insulative material such as for example polyurethane. In this embodiment, three (3) spaced-apart U-shaped grooves 106 are defined in the outer insulation layer 104. Each U-shaped groove 106 extends the length of the outer insulation layer 104 such that the two arms are positioned adjacent a first end of the outer insulation layer 104 and the U-shaped portion is positioned adjacent a second end of the outer insulation layer 104.

The thermal shield 100 also comprises a thermally conductive layer 108 coupled to an interior surface of the outer insulation layer 104. The thermally conductive layer is made of a thermally conductive material such as for example aluminum.

The thermal shield 100 also comprises an inner insulation layer 110 coupled to an interior surface of the thermally conductive layer 108. The inner insulation layer 110 is made of a thermally insulative material such as for example polyurethane.

The thermal shield 100 also comprises an inner protective layer 112 coupled to an interior surface of the inner insulation layer 110. The inner protective layer 112 is made of a protective material such as for example canvas.

The thermal shield 100 also comprises a heat exchange fluid circuit 120 thermally coupled to the thermally conductive layer 108. In this embodiment, the heat exchange fluid circuit 120 comprises three (3) U-shaped tubular members 122 each of which is positioned within a respective U-shaped groove 106 defined in the outer insulation layer 104. Each tubular member 122 comprises an inlet 124 and an outlet 126. A portion of each tubular member 122 is thermally coupled to the thermally conductive layer 108. As such, the tubular members 122 are partially encapsulated by the outer insulation layer 104 and exchange thermal energy with the thermally conductive layer 108. As will be appreciated, a coating such as for example thermally conductive grease may be used to increase thermal energy exchange between each tubular member 122 and the thermally conductive layer 108.

In this embodiment, the three (3) U-shaped tubular members 122 are coupled to the storage unit (not shown) via an inlet header 130 and an outlet header 140. The inlet header 130 is coupled to the inlets 124 of the tubular members 122. The inlet header 130 comprises an inlet 132 configured to receive heat exchange fluid from a storage unit (not shown) and an inlet header body 134 configured to direct the ingress of heat exchange fluid into each of the inlets 124.

The outlet header 140 is coupled to the outlets 126 of the tubular members 122. The outlet header 140 comprises an outlet 142 configured to receive heat exchange fluid from the outlet 126 of each of the tubular members 122 and an outlet header body 144 configured to direct the egress of heat exchange fluid back into the storage unit (not shown).

Figure 5:
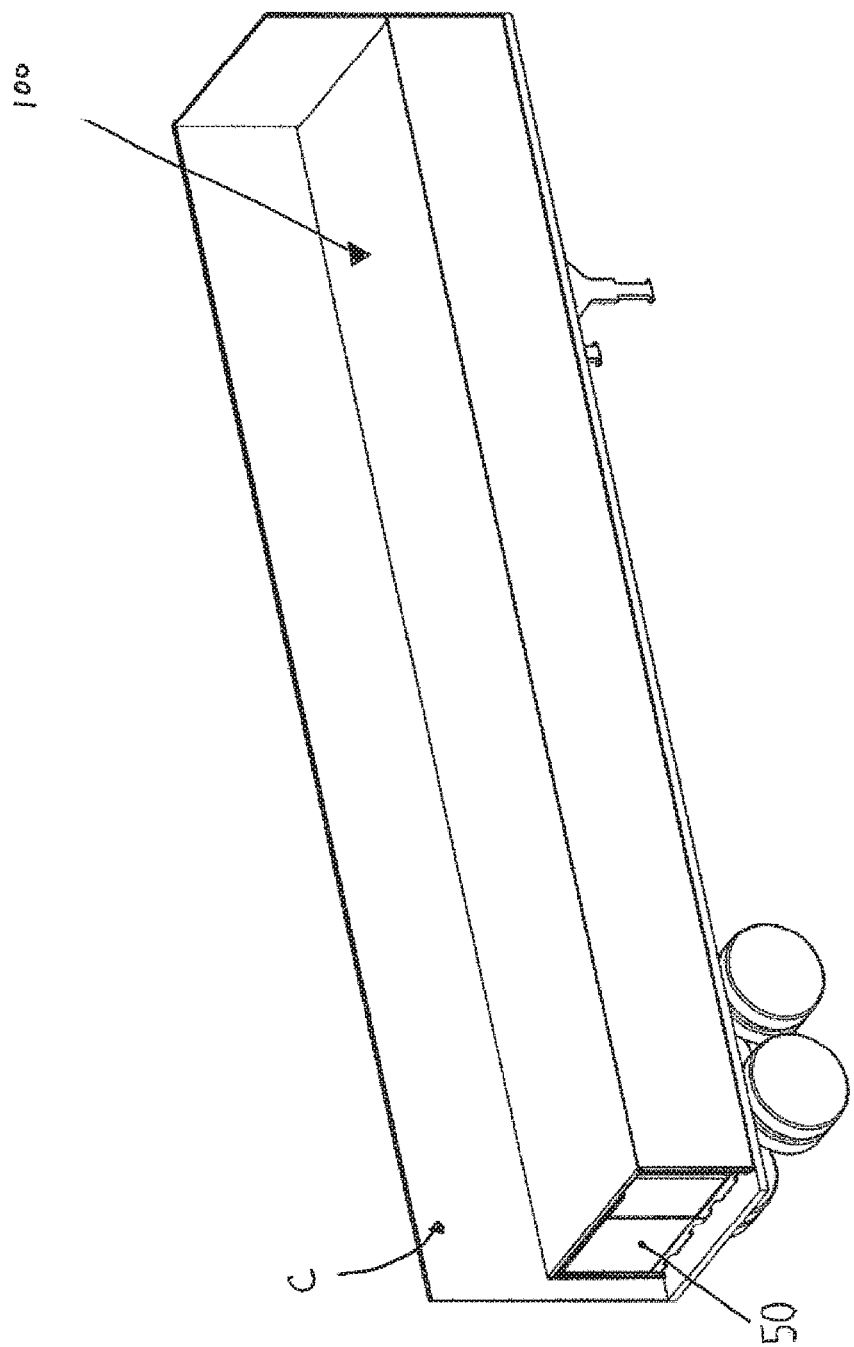
FIG. 5 is an isometric view showing the thermal shield of FIG. 2 positioned in a container during use.

During use, as shown in FIG. 5, the storage unit 50 containing heat exchange fluid and the thermal shield 100 are positioned inside a container C containing one or more temperature sensitive products. The thermal shield 100 is positioned such that it at least partially covers the one or more temperature sensitive products, like a blanket.

Heat exchange fluid is pumped from the storage unit 50 into the inlet header 130 by the pumping unit. Heat exchange fluid travels from the storage tank and through the inlet header 130. As heat exchange fluid travels into the inlet header 130 it is directed into the inlet 124 of each tubular member 122. Heat exchange fluid travels into the inlet 124, through each tubular member 122 and out of the outlet 126. Heat exchange fluid travels out of the outlet 126 to the outlet header 140, where it is directed back into the storage unit 50. Heat exchange fluid that returns back to storage unit 50 is mixed with any heat exchange fluid contained in the storage unit 50. In this embodiment, heat exchange fluid is continuously pumped from the storage unit 50, through the thermal shield 100 where it returns back to the storage unit 50.

As the heat exchange fluid travels through the tubular members 122, thermal energy is exchanged with the thermally conductive layer 108. As a result, the thermal shield 100 is selectively heated or cooled. A generally uniform temperature is maintained in the container C during shipping operations such that any item covered by the thermal shield does not spoil.

In this embodiment, when used as a heating thermal shield, the storage unit stores heat exchange fluid in the form of a heating liquid, such as for example glycol or a glycol solution.

In this embodiment, when used as a cooling thermal shield, heat exchange fluid in the form of a combination of ice slurry and water is used.

Figure 6:
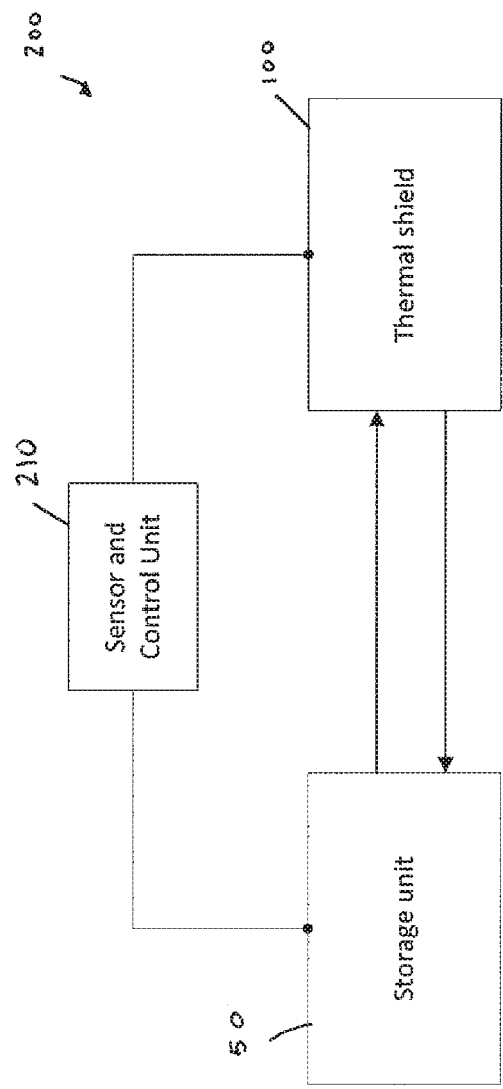
FIG. 6 is a block diagram of another embodiment of a system for maintaining a generally constant temperature in a container.

Turning now to FIG. 6 another embodiment of a system for maintaining a generally constant temperature in a container is shown and is generally identified by reference numeral 200. As can be seen, system 200 is similar to system 10. However, in this embodiment, system 200 comprises a sensor and control unit 210 electrically coupled to the storage unit 50 and the thermal shield 100. The sensor and control unit 210 is used to control the operation of system 200 such that heat exchange fluid is selectively pumped from the storage unit 50 to the thermal shield 100.

In this embodiment the sensor and control unit 210 comprises three inlet (3) flow sensors (not shown) each positioned within the inlet 124 of a respective tubular member 122 and three outlet (3) flow sensors (not shown) each positioned within the outlet 126 of a respective tubular member 122. The sensor and control unit 210 also comprises three (3) electrically controlled valves (not shown) each positioned in the inlet 124 of a respective tubular member 122. A controller (not shown) is coupled to the inlet and outlet flow sensors to monitor the flow rate of heat exchange fluid as it travels through each tubular member. A power source (not shown) is used to provide power to the various components of the sensor and control unit 210.

Figure 7:
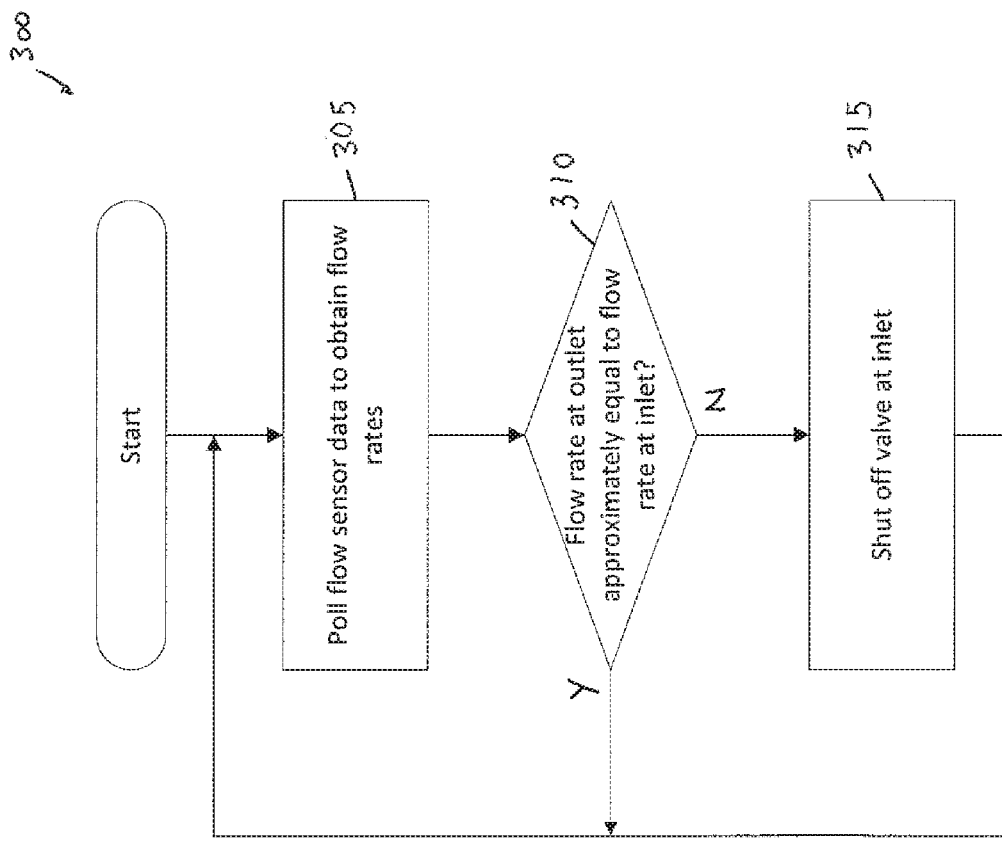
FIG. 7 a flow chart showing a method of operation of a controller forming part of the system of FIG. 6.

During operation, system 200 operates similar to system 10 described above. However, as heat exchange fluid is pumped from the storage unit 50 into the inlet header 130 by the pumping unit, the controller operates according to a method 300 shown in FIG. 7.

The controller polls the inlet and outlet flow sensors to receive sensor data representative of the flow rate of heat exchange fluid (step 305). For each tubular member, the flow rate at the inlet is compared to the flow rate at the outlet (step 310). If the flow rate at the outlet is not approximately equal to the flow rate at the inlet, it is assumed that there is a problem with the tubular member. The problem may be due to a leak or a crack in the tubular member. As such, the controller communicates a signal to close the electronically controlled valve to prevent heat exchange fluid from entering the problematic tubular member (step 315). If the flow rate at the outlet is approximately equal to the flow rate at the inlet, it is assumed that there is not a problem with the tubular member, and the method returns to step 305.

Figure 8:
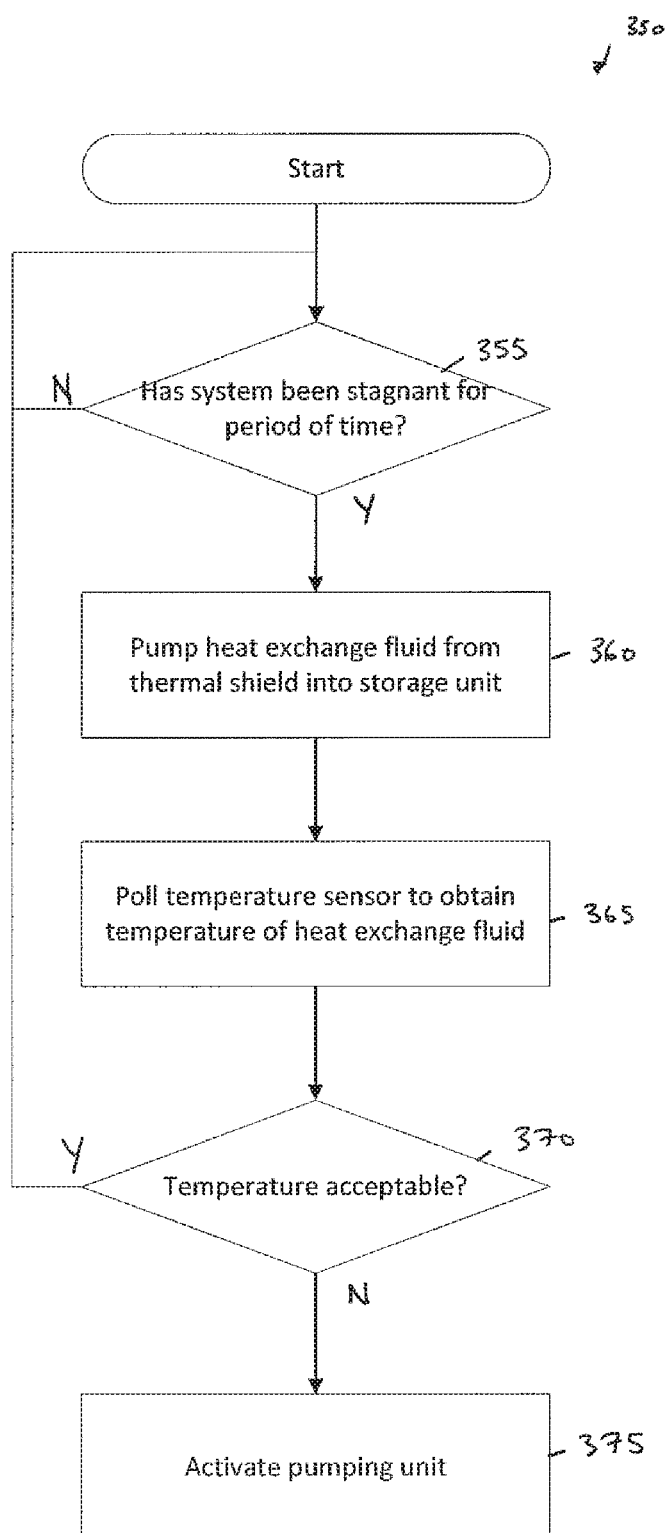
FIG. 8 a flow chart showing another method of operation of a controller forming part of the system of FIG. 6.

Although in embodiments above the sensor and control unit is described as comprising inlet and outlet flow sensors, those skilled in the art that other sensors may be used. In another embodiment, temperature sensors may be placed in the storage unit to measure the temperature of heat exchange fluid leaving and coming into the storage unit. In this embodiment, heat exchange fluid is pumped from the storage unit into the thermal shield, as described above. Heat exchange fluid is pumped into the thermal shield until the temperature of heat exchange fluid going into the thermal shield is approximately the same as the temperature of heat exchange fluid coming back into the storage unit. Once the temperature of heat exchange fluid going into the thermal shield is approximately the same as the temperature of heat exchange fluid coming back into the storage unit, the pumping unit is shut off and thus heat exchange fluid is stored in the thermal shield. Once the pumping unit is shut off, the controller operates according to a method 350 shown in FIG. 8.

When the pumping unit is shut off, the system is idle in that heat exchange fluid that is within the thermal shield is stored in the thermal shield. A check is performed to determine if the system 200 has been idle for a predefined period of time (step 355), that is, if the pumping unit has been shut off for the predefined period of time. If the system has been idle for less than the predefined period of time, the system remains idle. If the system has been idle for the predefined period of time or longer, the controller activates the pumping unit to pump a portion of heat exchange fluid from the thermal shield into the storage unit (step 360). As the portion of heat exchange fluid is pumped into the storage unit, the controller polls the temperature sensor placed in the storage unit to determine the temperature of the heat exchange fluid entering into the storage unit (step 365). The temperature of the heat exchange fluid is compared to a temperature threshold to determine if the temperature of the heat exchange fluid is at an acceptable level (step 370). If the temperature of the heat exchange fluid is at an acceptable level, the method returns to step 355. If the temperature of the heat exchange fluid is not at an acceptable level, the pumping unit is activated to replace the heat exchange fluid in the thermal shield with heat exchange fluid from the storage unit (step 375).

In another embodiment temperature sensors may be used to monitor the temperature of the container. If the temperature of the container is too hot or too cold, the controller activates the pumping unit to pump heat exchange fluid to the thermal shield, as described above. If the temperature of the container is not too hot or too cold, depending on the temperature sensitive products contained therein, heat exchange fluid is not pumped from the storage unit.

Those skilled in the art will appreciate that the sensor and control unit may comprise various combination of the embodiments described above. Further, the sensor and control unit may be used with additional sensors such as for example water sensors to detect condensation, fluid level sensors to detect fluid levels in the storage unit, etc.

Although step 355 of method 350 is described as determining if the system 200 has been idle for the predefined period of time, those skilled in the art will appreciate that alternatives are available. For example, method 350 may be performed such that heat exchange fluid is pumped into the thermal shield periodically, for example, every 5 minutes. In this example, a calculation may be performed based on the temperature of the container to determine how often the heat exchange medium stored within the thermal shield needs to be replaced.

In another embodiment, the sensor and control unit may comprise an alarm module configured to indicate to a user when a problem or leak has occurred. For example, in the event that one of the tubular members has a problem, an emergency light may be illuminated or an audible alarm may be triggered.

In another embodiment, the sensor and control unit may comprise a timer configured to track the time the system has been active. In the event that the system is active for greater than a threshold period of time, the system is shut down. Other sensors may be used to ensure the system does not malfunction due to extended use.

Although in embodiments above electronically controlled valves are used to block heat exchange fluid from entering a potentially problematic tubular member, those skilled in the art will appreciate that alternatives are available. For example, in another embodiment the electronically controlled valves may be used to selectively permit or block heat exchange fluid from entering a tubular member. In this embodiment, only one or more of the tubular members may permit heat exchange fluid from entering. As such, only a portion of the thermal shield may be heated or cooled as desired.

In another embodiment, the sensor and control unit may comprise one or more temperature sensors to monitor the temperature of heat exchange fluid in the storage unit. In the event that the temperature of the heat exchange fluid is approaching a threshold value, it is assumed that only a small amount of thermal energy remains. As such, the sensor and control unit may close one or more of the electronically controlled valves to ensure the remaining thermal energy is efficiently used.

In another embodiment, the amount of thermal energy in the storage unit may be estimated and this estimate may be used to selectively pump heat exchange fluid into the thermal shield. In one embodiment when the storage unit is initially filled with heat exchange fluid, the initial thermal energy may be determined. As heat exchange fluid is pumped from the storage unit into the thermal shield, the remaining amount of thermal energy may be calculated. For example, as heat exchange fluid flows from the storage unit, through the thermal shield, and back into the storage unit, the amount of energy transferred may be calculated by multiplying the average flow rate of the heat exchange fluid by the specific heat capacity of the heat exchange fluid and by the difference between the temperature of the heat exchange fluid leaving the storage unit and the temperature of the heat exchange fluid returning back to the storage unit and by the time the pumping unit is active. The average flow rate may be measured using a flow meter or sensor. The temperature may be measured using one or more temperature sensors. The time for which the pumping unit is active may be measured using a timer. The amount of thermal energy remaining may be converted to the time remaining until the thermal energy approaches zero. This time may be displayed to a user using an LED display.

Figure 9:
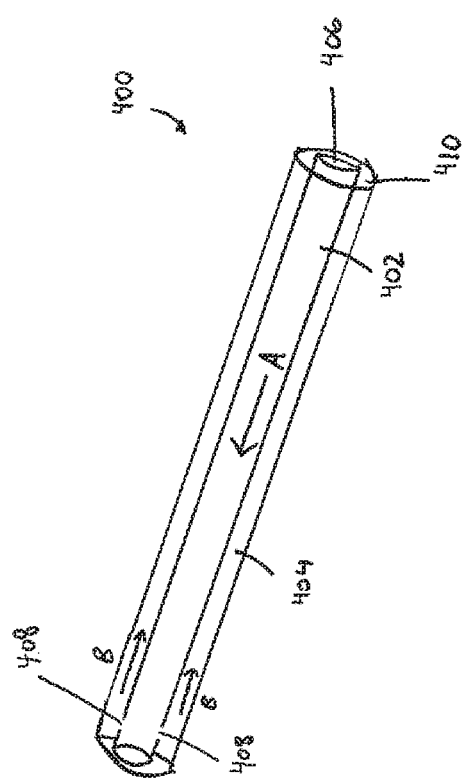
FIG. 9 is an isometric view of another embodiment of a tubular member.

Although in embodiments above the tubular members are described as being generally U-shaped, those skilled in the art will appreciate that alternatives are available. FIG. 9 shows another embodiment of a tubular member generally identified by reference numeral 400. In this embodiment, the tubular member 400 comprises an inner tube 402 and an outer tube 404 disposed around the inner tube 402. The inner tube 402 comprises an inlet 406 configured to direct the ingress of heat exchange fluid. The inner tube 402 comprises a pair of apertures 408 positioned at an end opposite that of the inlet 406. The outer tube 404 comprises an outlet 410 positioned adjacent to and circumscribing the inlet 406 of the inner tube 402.

During use, the tubular member 400 receives heat exchange fluid through the inlet 406 of the inner tube 402. The heat exchange fluid is pumped through the inner tube 402 as indicated by arrow A. The heat exchange fluid exits the inner tube 402 through the apertures 408 and through the outer tube 404 as indicated by arrow B. The heat exchange fluid travels through the outer tube 404 and out through the outlet 410.

One or more tubular members of the type of tubular member 400 may be used with thermal shield 100 similar to tubular member 22 described above.

Although in embodiments above the inner insulation layer is described as being made of a thermally insulative material such as for example polyurethane, those skilled in the art will appreciate that alternatives are available. For example, in another embodiment the inner insulation layer may be formed as an air gap. In this embodiment, by having an air gap between the heat exchange fluid circuit and the one or more temperature sensitive products, the risk of exposure to condensation is reduced.

Figure 10:
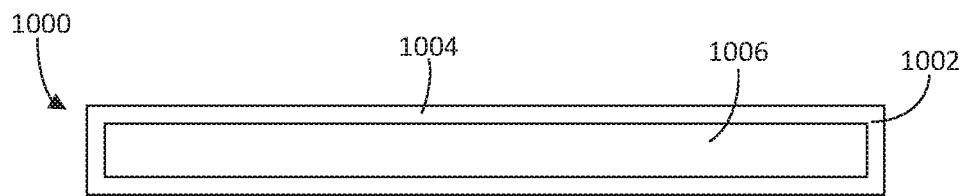
FIG. 10 is a cross-sectional view of another embodiment of a thermal shield.

Another embodiment of a thermal shield is shown in FIG. 10 and is identified with reference numeral 1000. The thermal shield 1000 comprises an insulation layer 1002 which in this embodiment is a single vacuum insulated panel (VIP) having a membrane casing 1004. The membrane casing 1004 is made of a flexible material. A low-conductivity material 1008 such as for example fiberglass is used to fill space within the membrane casing 1004. A valve (not shown) is used to provide access to the space within the membrane casing 1004. The valve connects to a vacuum to remove air from the space within the membrane casing 1004. The valve may also be used to re-introduce air into the space within the membrane casing 1004.

When air is present in the space within the membrane casing 1004, the thermal shield 1000 is flexible and can be easily rolled or folded.

During use, the thermal shield 1000 is placed such that it at least partially covers one or more temperature sensitive products, like a blanket. A vacuum (not shown) is used to evacuate air from the space within the membrane casing 1004 via the valve. Once air has been removed from the space within the membrane casing 1004, the insulating properties of the insulating layer are increased. As such, the thermal shield 1000 insulates the one or more temperature sensitive products.

When the thermal shield 1000 is not in use, air can be reintroduced to the space within the membrane casing 1004 via the valve. The thermal shield 1000 can then be rolled or folded and stored for future use.

In another embodiment, the thermal shield 1000 may comprise a heat exchange fluid circuit. For example, the thermal shield 1000 may comprise a thermally conductive layer coupled to an exterior surface of the membrane casing. In this example, a heat exchange fluid circuit is thermally coupled to the thermally conductive layer and comprises three (3) U-shaped tubular members, each of which is positioned intermediate the thermally conductive layer and the one of the membranes. Similar to that described above, each tubular member comprises an inlet and an outlet. The tubular members exchange thermal energy with the thermally conductive layer.

Similar to that described above, the three (3) U-shaped tubular members are coupled to the storage unit via an inlet header and an outlet header. The inlet header is coupled to the inlets of the tubular members. The inlet header comprises an inlet configured to receive heat exchange fluid from a storage unit (not shown) and an inlet header body configured to direct the ingress of heat exchange fluid into each of the inlets.

The outlet header is coupled to the outlets of the tubular members. The outlet header comprises an outlet configured to receive heat exchange fluid from the outlet of each of the tubular members and an outlet header body configured to direct the egress of heat exchange fluid back into the storage unit.

Although in embodiments above the heat exchange fluid circuit is described as comprising three (3) tubular members, those skilled in the art will appreciate that alternatives are available. For example, in another embodiment five (5) tubular members may be used. In another embodiment, a single tubular member may be used. For example, the single tubular member may extend about the surface of the thermally conductive layer, thereby defining a serpentine channel to direct the ingress of heat exchange fluid. In another embodiment, no tubular members are required. For example, the grooves defined in the outer insulation layer may be used as the heat exchange fluid circuit such that heat exchange fluid may be pumped therethrough. In another example, channels may be formed between two layers of a thermally conductive material. In yet another example, a moisture absorbing material may be used and may have channels formed therein. In this example, heat exchange fluid may be pumped into the moisture absorbing material such that at least some of the heat exchange fluid is absorbed by the moisture absorbing material.

Although in embodiments above the outer insulation layer is described as comprising spaced-apart U-shaped grooves and the tubular members are described as being positioned within the U-shaped grooves, those skilled in the art will appreciate that alternatives are available. For example, in another embodiment the U-shaped grooves may be configured such that when the tubular members are positioned therein, arms of neighboring tubular members are coupled to one another such that thermal energy is exchanged therebetween. A coating such as for example thermally conductive grease may be used to increase thermal energy exchange between the arms of neighboring tubular members.

Although in embodiments above the heat exchange fluid is described as being circulated through a storage unit, those skilled in the art will appreciate that alternatives are available. For example, rather than being recycled in the storage unit, the heat exchange fluid may remain contained in the tubular members. In this example, rather than a storage unit, a heat exchanger containing a heat exchange medium such as for example paraffin wax may be used. In this example, a circulation circuit is coupled to the inlet and outlet heaters and extends through the heat exchanger. The heat exchange fluid may be circulated through the heat exchange fluid circuit and passed through the heat exchanger via the circulation circuit to recharge the heat exchange fluid. As the heat exchange fluid passes through the circulation circuit it may be heated or cooled due to heat exchange between the heat exchange fluid and the heat exchange medium. The heated or cooled heat exchange fluid may then continue back into the heat exchange fluid circuit as described above.

Although in embodiments above the pumping unit is described as pumping heat exchange fluid into the heat exchange fluid circuit, those skilled in the art will appreciate that in other embodiments the pumping unit may be a vacuum unit used to draw heat exchange fluid from the heat exchange fluid circuit.

Although in embodiments above the heat exchange fluid is described as being pumped continuously from the storage tank through the thermal shield, those skilled in the art will appreciate that alternatives are available. For example, the heat exchange fluid may be pumped intermittently. As another example, the heat exchange fluid may be pumped through the thermal shield in a first flow direction for a period of time, and then may be pumped through the thermal shield in a second flow direction, opposite the first flow direction, for another period of time.

Those skilled in the art will appreciate that the thermal shield may comprise a connection mechanism configured to secure the thermal shield inside the container. Further, the thermal shield may comprise mechanisms to help a user position it within the container. For example, the outer protective layer of the thermal shield may comprise one or more riveted openings configured to couple to a strap system to help the user positioned the thermal shield over the one or more temperature sensitive products. Other mechanisms that may be used include suction cups, magnets, Velcro, a linear track mechanism, a cable system, etc.

The thermal shield may comprise one or more rigid members configured to provide support to the thermal shield. For example, in an embodiment a plurality of axially extending rigid members in the form of aluminum bars may be connected to the outer protective layer at positions intermediate the tubular members.

The thermal shield may be configured to be rolled or folded up when not in use. For example, in an embodiment all components of the thermal shield may be made of flexible materials such that the thermal shield may be rolled up when not in use. As another example, the thermal shield may comprise one or more spines or lines-of-weakness that are configured to operate in a hinge-like manner such that the thermal shield may be folded up when not in use.

Although in embodiments above the inner and outer protective layers are described as being made of a protective material such as for example canvas, those skilled in the art will appreciate that alternatives are available. For example, in another embodiment the inner protective layer may be made of a low-friction material to protect the thermal shield from internal impact during loading/unloading.

As will be appreciated, the storage unit may comprise a valve configured to selectively drain unwanted liquid from the storage unit during transportation. In another embodiment, liquid from the storage unit may be discharged at another location within the container where it may be used to cool the temperature within the container through evaporation.

Although in embodiments above the thermal shield is described as having inner and outer protective layers, those skilled in the art will appreciate that the thermal shield may have a single protective layer or no protective layer.

Although in embodiments above the thermal shield is described as comprising a heat exchange fluid circuit positioned interior of an exterior insulation layer, those skilled in the art will appreciate that alternatives are available. For example, in another embodiment two heat exchange fluid circuits may be positioned on opposite sides of an insulation layer or on opposite sides of the thermally conductive layer. In this example, the pumping unit may be configured to selectively pump heat exchange fluid to one or both of the heat exchange fluid circuits. For example, in the event that it is desired to prevent temperature sensitive products from overheating and if the temperature exterior of the thermal shield is less than the temperature underneath the thermal shield, then pumping heat exchange fluid through both heat exchange fluid circuits will cause heat to be extracted from underneath the thermal shield and to be emitted to the exterior of the thermal shield. Further, the heat exchange fluid circuits may be in fluid communication with one another.

Although embodiments have been described above with reference to the accompanying drawings, those of skill in the art will appreciate that variations and modifications may be made without departing from the scope thereof as defined by the appended claims.

What is claimed is:

1. A thermal shield comprising:
    an insulation layer having a space defined therein, wherein a low-conductivity material fills the space; and
    a valve configured to connect to a vacuum to remove air from the space, thereby increasing insulating properties of the insulation layer.

2. The thermal shield of claim 1, further comprising:
    a thermally conductive layer thermally coupled to a surface of the insulation layer.

3. The thermal shield of claim 2, further comprising:
    at least one heat exchange fluid circuit coupled to a first surface of the thermally conductive layer, the at least one heat exchange fluid circuit comprising at least one inlet configured to permit the ingress of heat exchange fluid.

4. The thermal shield of claim 3 wherein the at least one heat exchange fluid circuit extends about the first surface of the thermally conductive layer.

5. The thermal shield of claim 3 wherein the at least one heat exchange fluid circuit extends about the first surface of the thermally conductive layer in a serpentine path.

6. The thermal shield of claim 3 wherein the at least one heat exchange fluid circuit comprises at least one tubular member.

7. The thermal shield of claim 3 comprising an inlet header coupled to the at least one inlet of the heat exchange fluid circuit and configured to direct heat exchange fluid received from a storage unit to the at least one inlet.

8. The thermal shield of claim 3 wherein the heat exchange fluid circuit comprises at least one outlet configured to direct the egress of heat exchange fluid.

9. The thermal shield of claim 8 comprising an outlet header coupled to the at least one outlet of the heat exchange fluid circuit and configured to direct heat exchange fluid received from the at least one outlet to the storage unit.

10. The thermal shield of claim 1 wherein the thermal shield is configured to be folded up when not in use.

11. The thermal shield of claim 1 wherein the thermal shield is configured to be rolled up when not in use.

12. The thermal shield of claim 3 wherein the at least one heat exchange fluid circuit comprises a moisture absorbing material configured to absorb at least a portion of the heat exchange fluid.

13. The thermal shield of claim 1, wherein the low-conductivity material is fiberglass.

14. The thermal shield of claim 1, wherein the insulation layer is a single vacuum insulated panel.

15. The thermal shield of claim 1, wherein the insulation layer is made of a flexible material.

16. A method for maintaining a generally constant temperature comprising one or more temperature sensitive products, the method comprising:
   providing a thermal shield comprising an insulation layer having a space defined therein, a low-conductivity material at least partially filling the space, and a valve configured to connect to a vacuum;
   positioning the thermal shield over at least a portion of the one or more temperature sensitive products; and
   connecting a vacuum to the valve to remove air from the space, thereby increasing insulating properties of the insulation layer.

17. The method of claim 16, further comprising:
   after use:
      re-introducing air into the space within the insulation layer via the valve; and
      folding or rolling up the thermal shield.

* * * * *